(12) United States Patent
Sood et al.

(10) Patent No.: US 7,394,800 B2
(45) Date of Patent: Jul. 1, 2008

(54) RESERVATION WITH ACCESS POINTS

(75) Inventors: Kapil Sood, Hillsboro, OR (US); Jesse Walker, Portland, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 442 days.

(21) Appl. No.: 11/171,867

(22) Filed: Jun. 30, 2005

(65) Prior Publication Data

US 2007/0002819 A1    Jan. 4, 2007

(51) Int. Cl.
 *H04B 7/212* (2006.01)
(52) U.S. Cl. ............... 370/348; 370/310.2; 370/328; 370/338; 370/230; 370/443
(58) Field of Classification Search ............ 370/348, 370/337, 310.2, 328, 338, 230, 443; 455/410, 455/411, 436, 432.1
See application file for complete search history.

(56) References Cited

U.S. PATENT DOCUMENTS

| | | | | |
|---|---|---|---|---|
| 5,278,833 A | * | 1/1994 | Crisler et al. | 370/348 |
| 5,295,140 A | * | 3/1994 | Crisler et al. | 370/443 |
| 5,633,911 A | * | 5/1997 | Han et al. | 455/464 |
| 7,184,447 B1 | * | 2/2007 | Koo et al. | 370/441 |
| 7,339,946 B2 | * | 3/2008 | Anderson et al. | 370/443 |
| 2003/0114159 A1 | * | 6/2003 | Park et al. | 455/436 |
| 2003/0179731 A1 | * | 9/2003 | Noguchi et al. | 370/331 |
| 2003/0235305 A1 | | 12/2003 | Hsu | |

FOREIGN PATENT DOCUMENTS

| | | | |
|---|---|---|---|
| EP | 1 324 628 | A | 7/2003 |
| WO | WO 01/39538 | A | 5/2001 |
| WO | WO 2005/015938 | A | 2/2005 |

OTHER PUBLICATIONS

Edney J, "TAP-JIT Resources Pre-Allocation", IEEE P802.11 Wireless LANS, XX, XX, No. 80211-5/228RO, Mar. 15, 2005, pp. 1-11.
"Draft amendment to Standard for Telecommunications and Information Exchange Between systems—LAN/MAN Specific Requirements—Part 11: Wireless Medium Access Control (MAC) and physical layer (PHY) specification: Amendment 8: Fast BSS Transition", IEEE P802.11 Wireless LANS, XX, XX, Jun. 3, 2005, pp. 1-46.

* cited by examiner

*Primary Examiner*—William Trost
*Assistant Examiner*—Huy Q Phan
(74) *Attorney, Agent, or Firm*—Schwabe, Williamson & Wyatt, P.C.

(57) ABSTRACT

A reservation protocol is provided to enable a client mobile station to make a number of reservations with a number of access points to facilitate its access of a network at a future point in time, as it roams, and subsequently exercise one of the reservations.

20 Claims, 5 Drawing Sheets

Client Mobile Station    Access Point (Current)    Access Point (Next)

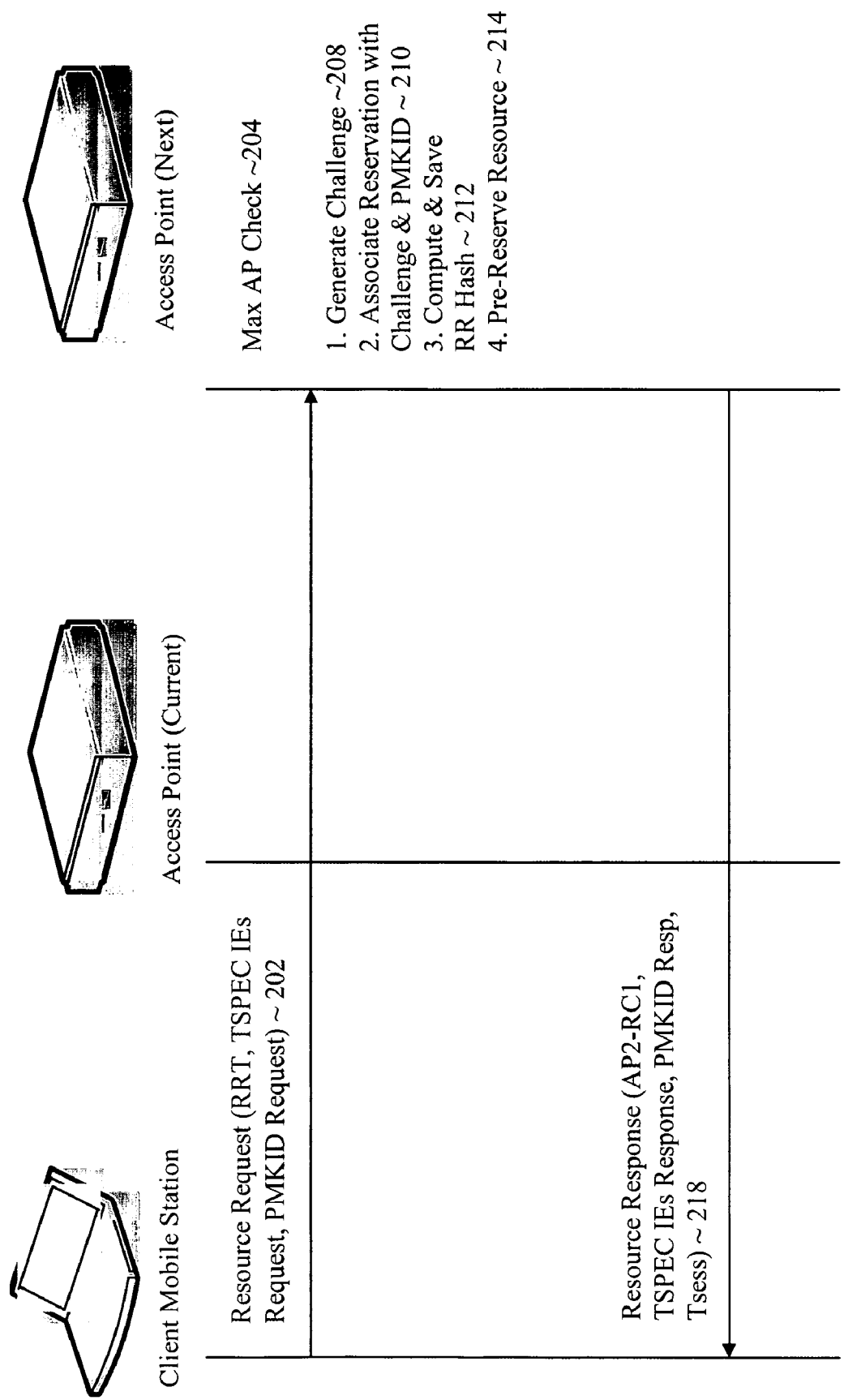

RESERVATION WITH ACCESS POINTS

TEHCNICAL FIELD

Embodiments of the present invention relate generally to the field of data communication and, in particular, to client mobile station making reservations with access points to facilitate access of a network.

BACKGROUND OF THE INVENTION

Advances in microprocessor and related technologies have led to wide spread deployment and adoption of numerous general purpose as well as special purpose computing devices. General purpose computing devices, such as servers and desktop computers, are now endowed with computing power that was once reserved for the most expensive high end computers, requiring special conditioned environment to operate. At the same time, advances in networking, telecommunication, satellite, and other related technologies have also led to increase in connectivity between computing devices, making possible sophisticated networked computing over private and/or public networks, such as the Internet. Examples of these sophisticated applications include but are not limited to Voice over IP (VoIP) and multimedia applications.

Recently, continuing advances in wireless communication technology have also made wireless connectivity ubiquitous. Typically, for wireless networks, e.g. Wi-Fi, a client Mobile Station (STA) connects to an Access Points (AP) to obtain network service. STA could be considered "roaming" from one AP to a new AP for a number of reasons. With VoIP and multimedia applications, good quality of service requires that a STA be able to quickly establish connection with a new AP for continuing network service without interruption. Further, the new AP should be able to provide commensurate level of quality of service for the applications running on the STA as the previous AP.

BRIEF DESCRIPTION OF THE DRAWINGS

The present invention will be described by way of exemplary embodiments, but not limitations, illustrated in the accompanying drawings in which like references denote similar elements, and in which:

FIG. 5 illustrates various alternate embodiments to FIG. 2.

DETAILED DESCRIPTION OF ILLUSTRATIVE EMBODIMENTS

Illustrative embodiments of the present invention include but are not limited to a reservation protocol that allows for reservations with multiple AP by a STA, STA and AP adapted to practice the corresponding aspects of the reservation protocol.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The term "Wi-Fi", short for wireless fidelity, refers to any type of 801.11 network, 802.11a, 802.11b and so forth. The term 802.11 refers to a family of specifications developed by Institute of Electrical and Electronic Engineers. The terms "STA" and "AP" have the same meaning as defined by the 802.11 family of specifications.

The phrase "in one embodiment" is used repeatedly. The phrase generally does not refer to the same embodiment; however, it may. The terms "comprising", "having", and "including" are synonymous, unless the context dictates otherwise.

Figure 1:
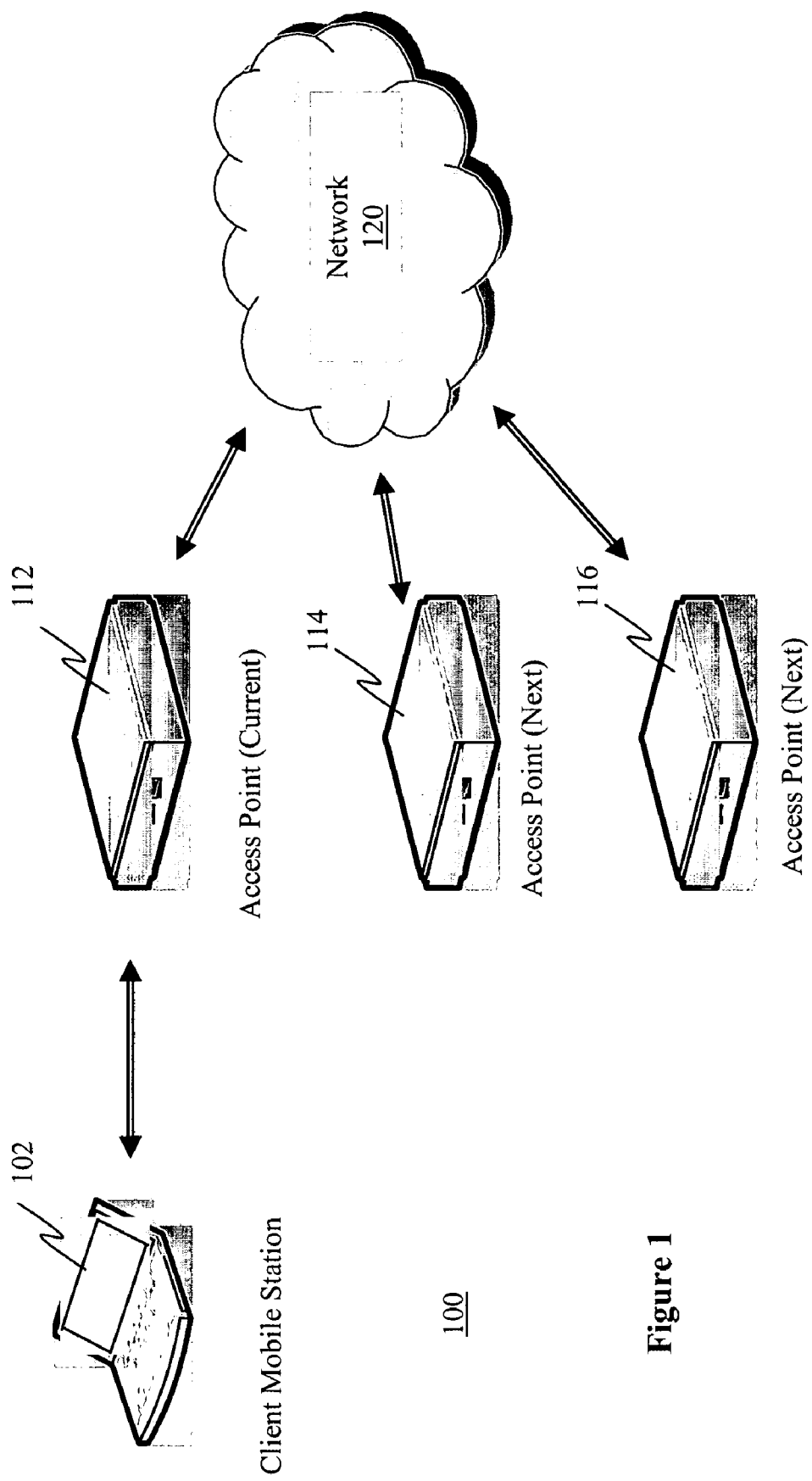
FIG. 1 illustrates an overview of the invention, in accordance with various embodiments.

Referring now to FIG. 1, wherein an overview of the present invention, in accordance with various embodiments, is shown. As illustrated, for the embodiments, client mobile station (STA) 102 establishes a wireless communication connection with one of the Access Points (AP) 112, 114 or 116 to access Network 120. STA may access Network 120 for a variety of reasons, including but not limited to obtaining multimedia data and/or services from a number of multimedia servers (not shown). The AP currently facilitates network access for STA 102, for ease of understanding, is referred to as AP_Current. For FIG. 1, that is AP 112. Other APs with which STA 102 may be subsequently connected to access network 120, as it roams, for ease of understanding, is referred to as AP_Next. For FIG. 1, that includes AP 114 and AP 116. In actual practice, there may be many AP_Next.

As will be described in more detail below, to enhance the likelihood that STA 102 is able to quickly establish connection with a AP_Next as it roams, embodiments of the present invention provide a reservation protocol where STA 102 may make reservations with "N" number of AP_Next to facilitate access to Network 120 at a future point in time, and subsequently exercise one of the reservations, as it roams. N may be greater than 1. In various embodiments, the reservation protocol is a two phase protocol, a reservation phase (also may be referred to as phase one), and a usage phase (also may be referred to as phase two).

Further, in various embodiments, regardless of whether N is equal to 1 or greater than 1, embodiments of the present invention also facilitate association of a request to exercise a reservation with a proper prior reservation, authentication of an reservation exercising STA is the STA who made (own or otherwise has the right to exercise) the reservation, a reservation is exercised within a pre-allotted amount of time, and automatic release of all other concurrent reservations by a STA when it exercises one of its reservations.

Further, in various embodiments, a reservation could be made for a network resource, including but not limited to security parameters, quality of service parameters, voice and video resources.

In various embodiments, STA 102 may be a laptop computer, a tablet computer, a personal digital assistant, a wireless mobile phone, or other portable electronic device endowed with wireless communication capabilities. In various embodiments, Network 120 is the Internet. In other embodiments, it may be a private or semi-private network. In various embodiments, STA 102 and AP 112, 114 and 116 communicate in accordance with an enhanced networking protocol that is compatible with the Wi-Fi networking protocol, e,g, an enhanced 802.11 protocol, such as 802.11r further enhanced with the features of the present invention.

Figure 2:
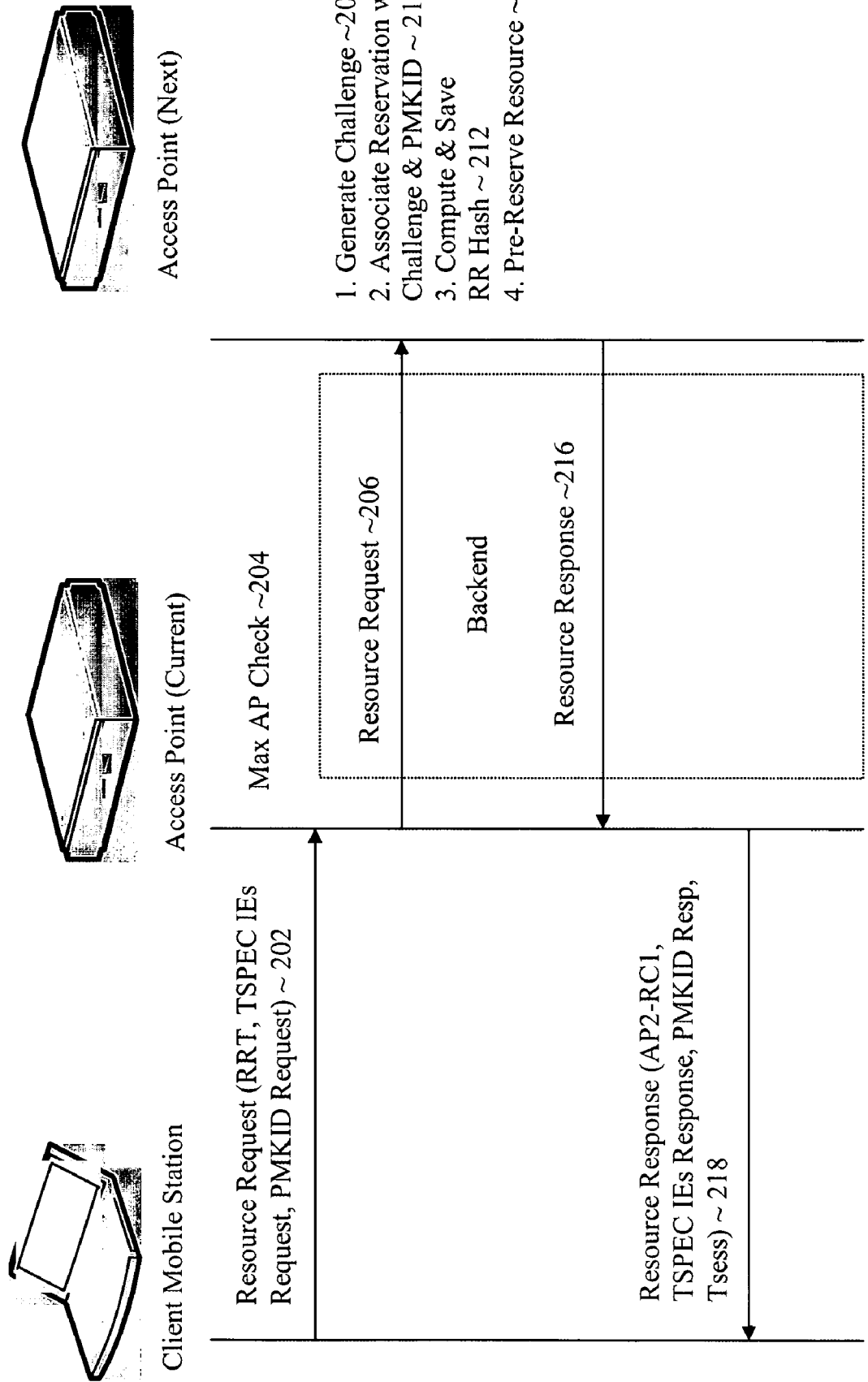
FIGS. 2-3 illustrate a reservation protocol, in accordance with various embodiments.
Figure 3:
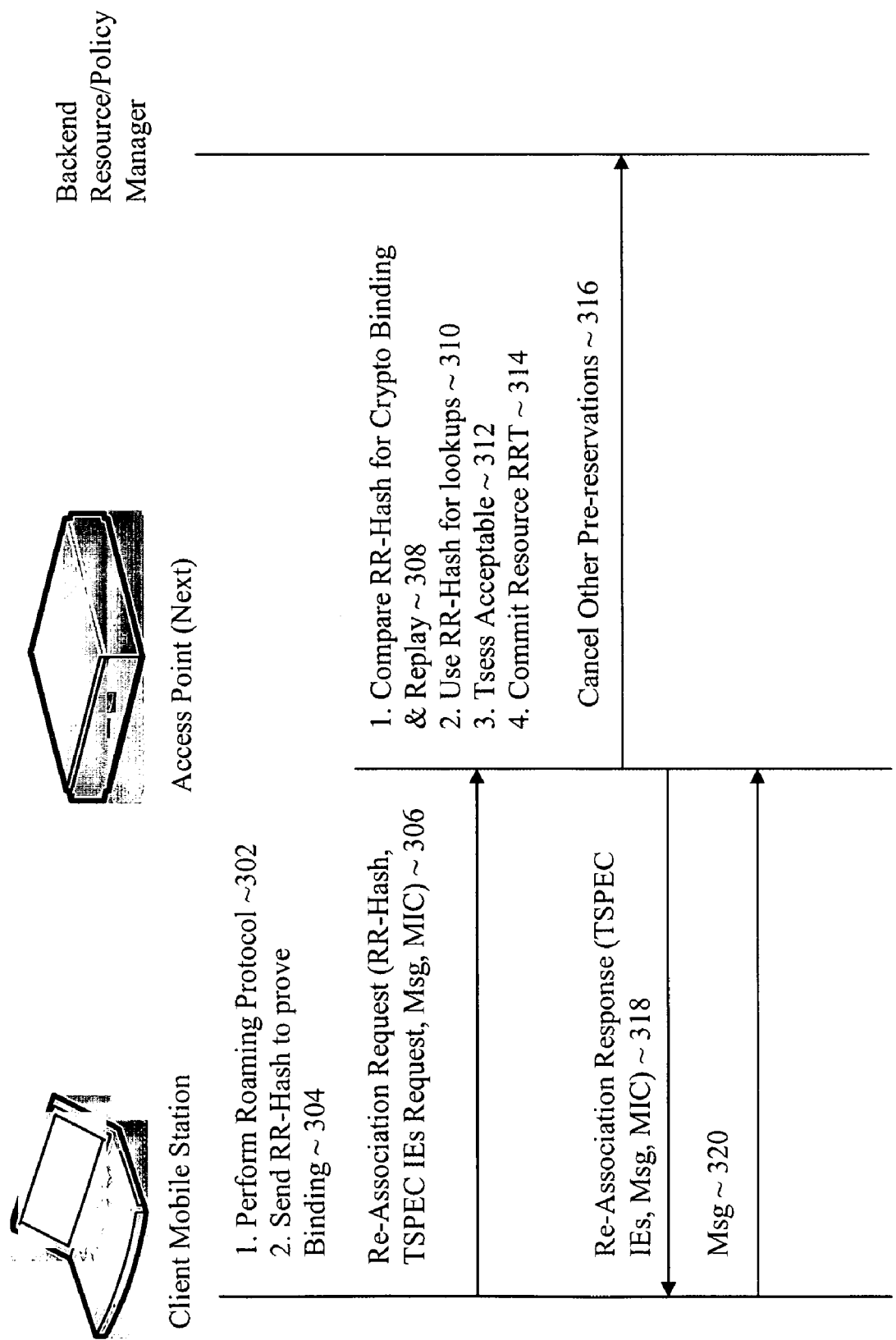

FIGS. 2-3 illustrate this enhanced networking protocol in accordance with various embodiments. More specifically, FIGS. 2-3 illustrate phase one and two of the enhanced networking protocol respectively. As illustrated in FIG. 2, phase one of the protocol starts with STA 102 submitting a reservation request to its AP_Current, to make a reservation with an AP_Next, 202 to facilitate its access to Network 120 at a later point in time, when it roams. In alternate embodiments, STA 102 may submit a reservation request to AP_Next 202 directly, as illustrated in FIG. 5.

In various embodiments, the reservation request may be in the form of

Resource Request (RRT, TSPECT IEs Request, PMKID Request), where

RRT=Resource Request Tuple,

TSPEC IE=Quality of Service parameters, voice and video parameters, like Traffic Specification Information Elements, and Traffic Class Information Element PMKID=Security parameters, like Pairwise Master Key Id.

In various embodiments, RRT may comprise <STA-MAC-Address, AP_Next-BSSID, AP_Current-BSSID>, where STA-MAC-Address is STA's Media Access Control Address, AP_Next-BSSIS and AP_Current-BSSID are AP_Next and AP_Current's Basic Service Set Id of AP_Next and AP_Current respectively.

In various embodiments, the semantics of TSPEC IC, PMKID and BSSID are the same as these terms are defined for the 802.11 family of protocols. In other embodiments, the semantics are their substantial equivalents.

Continuing to refer to FIG. 2, for the illustrated embodiments, on receipt of the Resource Request, AP_Current checks to determine whether the requesting STA has already made the maximum permissible number of reservations with various AP_Next, 204. If AP_Current determines that the requesting STA has already made the maximum permissible number of reservations with various AP_Next, AP_Current rejects the reservation request (not shown). On the other hand, if AP_Current determines that the requesting STA has not already made the maximum permissible number of reservations with various AP_Next, AP_Current forwards the Resource Request to the target AP_Next, 206. In various embodiments, the Resource Request is forwarded to the target AP_Next via the backend of the wireless network.

For the alternate embodiments of FIG. 5, whether STA had made the maximum permissible number of reservations with various AP_Next may be checked by the AP_Next receiving the request, e.g. with a backend service.

In response, assuming the target AP_Next has the resource to accept the reservation, for the illustrated embodiments, AP_Next generates a challenge (AP2-RC1) (to facilitate subsequent association of a reservation exercise with the proper prior reservation, and authentication of the exercising STA), 208. Upon generation, AP_Next associates the challenge with the reservation, 210. In various embodiments, AP_Next further associates PMKID of the STA and AP_Next with the reservation, 210. Next, for the embodiments, AP_Next computes a hash (RR Hash) for the reservation, and saves the computed hash, 212. Finally, AP_Next reserves the resources necessary to facilitate STA in accessing Network 120 at a later point in time, when it exercises the reservation, 214.

In various embodiments, if AP_Next does not have the resource to accept the reservation, AP_Next rejects/declines the reservation request (not shown). In alternate embodiments, AP_Next may forward the request to another AP_Next, and inform STA to work with the other AP_Next directly, or indirectly with its assistance. In various embodiments, the challenge is randomly generated. In various embodiments, the RR Hash is computed as follows:

RRHash=SHA1-128(AP2_RC1∥RRT∥PMKID-STA-AP_Next∥"CryptoBind"), where AP2_RC1, and RRT are as earlier described, and PMKID-STA-AP_Next is the Pairwise Master Key ID between the requesting STA and the target AP_Next.

Still referring to FIG. 2, for the illustrated embodiments, after reserving the resource to facilitate STA access Network 120 at a later point in time (if it exercises its reservation), AP_Next sends a resource (reservation) response back to STA via AP_Current, 216. In various embodiments, the resource (reservation) response is sent to AP_Current via the backend of the wireless network. On receipt, AP_Current forwards the resource (reservation) response to STA, 218. Alternatively, for the embodiments of FIG. 5, AP_Next 206 sends a response back directly to STA 102.

As illustrated, for the embodiments, the resource response may include one or more of AP2_RC1, TSPEC IEs Response, PMKID Response, and Tsess. AP2_RC1, TSPEC IE and PMKID have the same meaning as earlier described. Tsess is the duration of time the reservation will be held open (i.e. valid and exercisable), after which, the reservation will expire, and may not be exercised.

Referring now to FIG. 3, wherein phase two of the enhanced reservation protocol is illustrated, in accordance with various embodiments. As illustrated, for the embodiments, the phase two starts with STA initiating the process to exercise a reservation as called for by a conventional reservation protocol, e.g. like 802.11's Fast Transitioning and Roaming base protocol, 302. Thereafter, STA generates and sends the RR Hash to prove that it is the rightful owner of a reservation, 304.

Next, STA sends a re-association request to be re-associated with the reservation, 306. In various embodiments, the re-association request may include the following information, RR-Hash, TSPEC IEs Request, MSG, and MIC, where RR-Hash, TSPEC IE are as described earlier, and MSG and MIC stand for messages and message integrity checks.

In response, AP_Next compares the received RR Hash to ensure that STA is the rightful owner of a reservation, 308. AP_Next further uses the RR Hash to lookup the reservation, 310. Further, for the embodiments, AP_Next also examines Tsess to determine if the reservation remains valid (unexpired), 312. If Tsess has elapsed, AP_Next rejects the re-association request (not shown). If Tsess has not elapsed, AP_Next associates STA with its reservation, and commits the reserved resources to facilitate STA's access of Network 120, 314.

Thereafter, for the illustrated embodiments, AP_Next further cancels all other pre-reservations made by STA with the various AP_Next, 316. In various embodiments, the cancellation is effectuated via the backend of the wireless network. In alternate embodiments, STA may be assigned with the responsibility for cancellation the other reservations. In various embodiments, each AP_Next also automatically cancels the reservation a STA has made with the AP_Next if the STA fails to exercise the reservation within Tsess. AP_Next may be alerted of the passing of Tsess via any one of a number of techniques, including but not limited to the employment of a timer, set at the time the reservation is made.

In alternate embodiments, other techniques to bind the phases of the reservation, and/or the STA and/or AP to the reservation, cryptographic or otherwise, may be practiced instead.

Figure 4:
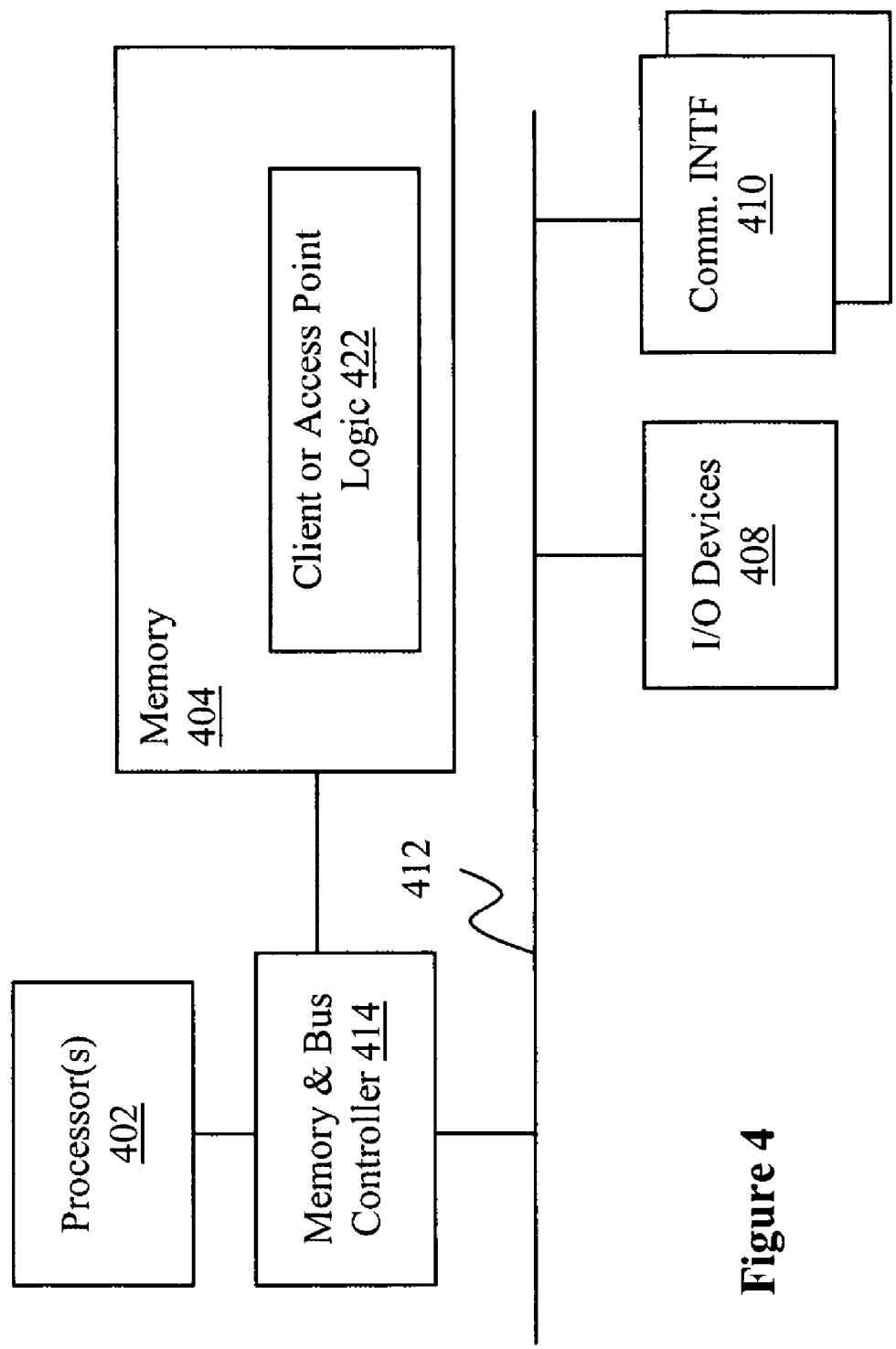
FIG. 4 illustrates an example computing device suitable for use as either a STA or an AP, to practice corresponding aspects of the invention, in accordance with various embodiments.

FIG. 4 illustrates a block diagram view of an example computing device suitable for use as either STA or AP of FIG. 1, in accordance with one embodiment. As illustrated, computing device 400 includes processor 402, memory 404, memory-bus controller 414 and bus 412 coupled to each other as shown. Further, computing device 400 also includes I/O devices 408 and communication interface(s) 410 coupled to each other and the earlier described elements as shown.

In alternate embodiments, in particular, in embodiments where computing device 400 is used as STA, computing device may also include mass storage device (not shown).

Each of the elements represents a broad range of the corresponding element known in the art or to be designed consistent with the teachings of the present invention. They perform their conventional functions, i.e. processing, storage, and so forth. In particular, memory 404 (and mass storage) is (are) employed to store temporal (and persistent copies) of reservation logic 422. Reservation logic 422 is adapted to practice the corresponding aspect of the earlier described enhanced reservation protocol to enable computing device 400 to be used either as a STA or an AP. For example, in the case of embodiments adapted for use an AP, reservation logic 422 may include regulation logic to regulate reservation request by a STA, allowing a reservation request only of STA has not exceeded a permissible maximum number of concurrent reservations with various AP_Next. In various embodiments, the permissible maximum may be configurable.

In various embodiments, communication interface(s) 410 includes a wireless networking interface. In various embodiments adapted for use as an AP, communication interfaces 410 may further includes one or more wireline or wireless network interface. The first wireless network interface may be used to communicate with a STA, while the second wireline/wireless network interface may be used to connect to Network 120.

In various embodiments adapted for use as a STA, computing device 400 may be a desktop computer, a tablet computer or a palm sized computing device. For these embodiments, I/O devices 408 may include a keyboard and a cursor control device.

In alternate embodiments, reservation logic 422 may be integrated with memory-bus controller 414 instead. In still other embodiments, reservation logic 422 may be integrated in other components, e.g. a dedicated discrete component.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. An apparatus, comprising:
    reservation logic designed to exercise a reservation with an access point to access a network during a point in time, including logic designed to generate and send a request to the access point to exercise the reservation, with the request having a response to a challenge associated with the reservation earlier posted by the access point when the reservation was earlier made with the access point; wherein the reservation logic further comprises logic designed to generate a reservation request for the reservation and submit the reservation request to the access point via another access point, or directly to the access point, the another access point facilitating the apparatus in accessing the network at the time of submission of the reservation request, and to generate additional one or more reservation requests to make reservation or reservation with one or more additional access points to access the network during the point in time, and to cause the reservation or reservations with the one or more additional access points to be cancelled when the reservation with the access point is exercised.

2. The apparatus of claim 1, wherein the reservation logic further comprises logic designed to generate the response to the challenge.

3. The apparatus of claim 2, wherein the logic to generate the response comprises logic designed to generate a hash based at least in part on data received from the access point when the reservation was made with the access point.

4. The apparatus of claim 3, wherein the data comprise one or more selected from the group consisting of a random challenge issued by the access point, data associated with an original reservation request submitted by the apparatus to make the reservation, quality of service parameters, and pairwise master key identification between the apparatus and the access point.

5. The apparatus of claim 4, wherein the data associated with an original reservation request comprises one or more selected from the group consisting of the apparatus's media access control address, the access point's basic service set identifier, and another access point's basic service set identifier, the other access point being an access point facilitating the apparatus in accessing the network at the time of submission of the original reservation request.

6. The apparatus of claim 1, wherein the reservation logic further comprises logic designed to automatically release the reservation or reservations with the one or more additional access points by cancelling the reservations with the one or more additional access points when the reservation with the access point is exercised.

7. The apparatus of claim 1, wherein the reservation request includes one or more selected from the group consisting of the apparatus's media access control address, the access point's basic service set identifier, and the other access point's basic service set identifier.

8. A method to be performed on a mobile station comprising:
    submitting a reservation request at a first point in time to make a reservation directly with a first access point, or via a second access point, the reservation to reserve resource on the first access point to facilitate the mobile station in accessing a network in a future point in time, and the second access point facilitating the mobile station in accessing the network at the time of submission of the reservation request;
    submitting one or more additional reservation requests make one or more reservations with one or more additional access points, the one or more additional reservations to reserve one or more resources of the one or more additional access pints to facilitate the mobile station in accessing the network in the future point in time;
    submitting a reservation exercise request to the first access point at a second point in time subsequent to the first point in time to exercise the reservation with the first access point, including with the reservation exercise request a response to a challenge associated with the reservation posted by the first access point at the time the reservation was made with the first access point; and causing the one or more additional reservations with one or more resources of the one or more additional access points to be cancelled when the reservation with the first access point exercised.

9. The method of claim 8, wherein the method further comprises generating the response to the challenge, including generation of a hash based at least in part on data received from the first access point at the time the reservation was made, which includes data associated with the reservation request submitted by the mobile station.

10. An article comprising:
storage medium; and
instructions stored on the storage medium designed to program an apparatus to enable the apparatus to perform the method of claim 8.

11. A system comprising:
a communication interface;
a mass storage;
a memory;
a controller coupled to the communication interface, the memory and the mass storage;
a processor coupled to the controller; and
reservation logic designed to exercise a reservation with an access point to access a network during a point in time, including logic designed to generate and send a request to the access point to exercise the reservation, with the request having a response to a challenge associated with the reservation earlier posted by the access point when the reservation was made with the access point, the reservation logic being either disposed in the memory or integrated with the controller;
wherein the reservation logic further comprises logic designed to generate a reservation request for the reservation and submit the reservation request to the access point via another access point, or directly to the access point, the another access point facilitating the system in accessing the network at the time of submission of the reservation request, to generate additional one or more reservation requests to make one or more reservations with one or more additional access points to access the network during the point in time, and to cause the reservation or reservations with the one or more additional access points to be cancelled when the reservation with the access point is exercised.

12. The system of claim 11, wherein the reservation request includes one or more selected from the group consisting of the system's media access control address, the access point's basic service set identifier, and the other access point's basic service set identifier.

13. The system of claim 11, wherein the reservation logic further comprises logic designed to automatically release the reservation or reservations with the one or more additional access points by cancelling the reservations with the one or more additional access points when the reservation with the access point is exercised.

14. An apparatus comprising:
first and second communication interfaces to couple the apparatus to a network and to communicate with a client mobile station respectively;
access logic coupled to the first and second communication interfaces, and designed to facilitate the client mobile station in accessing the network; and
reservation logic coupled to the access logic, and designed to facilitate the client mobile station in exercising a reservation previously made with the apparatus to facilitate the client mobile station in accessing the network at a point in time, including logic designed to determine whether the client mobile station has provided a proper response to a challenge associated with the reservation earlier posted by the apparatus when the reservation was made with the apparatus, and the reservation logic further including logic to facilitate, when the previously made reservation is exercised, in cancelling one or more other reservations previously made by the client mobile station with other apparatuses for accessing the network at the point in time.

15. An apparatus, comprising:
first and second communication interfaces to couple the apparatus to a network and to communicate with a client mobile station respectively;
access logic coupled to the first and second communication interfaces, and designed to facilitate the client mobile station in accessing the network; and
reservation logic coupled to the access logic, and designed to facilitate the client mobile station in exercising a reservation previously made with the apparatus to facilitate the client mobile station in accessing the network, including logic designed to determine whether the client mobile station has provided a proper response to a challenge associated with the reservation earlier posted by the apparatus when the reservation was made with the apparatus;
wherein the reservation logic further comprises logic designed to facilitate the client mobile station in making another reservation with another apparatus, while the client mobile station is being facilitated by the access logic in accessing the network, to facilitate the client mobile station to access the network at a future point in time, including logic designed to regulate at least a number of reservations the client mobile station can make with other apparatuses.

16. The apparatus of claim 15, wherein the logic to determine includes logic designed to determine whether a hash submitted by the client mobile station as part of an attempt to exercise the reservation is a properly generated hash that is based at least in part on data provided by the apparatus at the time the reservation was made, which includes data associated with an original reservation request submitted by the client mobile station.

17. The apparatus of claim 15, wherein the reservation logic further comprises logic designed to determine whether the reservation has expired.

18. The apparatus of claim 15, wherein the reservation logic further comprises logic designed to cancel other unexercised reservations the client mobile station had made with other apparatuses, in response to the client mobile station exercising the reservation the client mobile station made with the apparatus.

19. The apparatus of claim 15, wherein the reservation logic further comprises logic designed to cancel the reservation, if the client mobile station fails to exercise the reservation within a time period.

20. The apparatus of claim 15, wherein the regulation logic comprises logic designed to allow the other reservation to be made with the other apparatus, only if the client mobile station has a number of reservations with other apparatuses that is lower than a permissible maximum of reservations with other apparatuses.

* * * * *

UNITED STATES PATENT AND TRADEMARK OFFICE
CERTIFICATE OF CORRECTION

PATENT NO. : 7,394,800 B2  
APPLICATION NO. : 11/171867  
DATED : July 1, 2008  
INVENTOR(S) : Kapil Sood et al.

Page 1 of 1

It is certified that error appears in the above-identified patent and that said Letters Patent is hereby corrected as shown below:

Column 6  
Lines 59-60, "...requests make..." should read --...requests to make...--.

Column 6  
Line 63, "...access pints..." should read --...access points...--.

Column 7  
Line 5, "...with one..." should read --...with the one…--.

Column 7  
Line 8, "...point exercised." should read --...point is exercised.--.

Signed and Sealed this

Twenty-eighth Day of July, 2009

JOHN DOLL  
*Acting Director of the United States Patent and Trademark Office*